United States Patent

Oda et al.

[11] Patent Number: 5,699,280
[45] Date of Patent: Dec. 16, 1997

[54] DEVICE FOR DETERMINING A DISTANCE RANGE OF AN OBJECT

[75] Inventors: Hajime Oda; Takuma Takahashi, both of Yotsukaido, Japan

[73] Assignee: Seiko Precision Inc., Japan

[21] Appl. No.: 525,349

[22] Filed: Sep. 7, 1995

[30] Foreign Application Priority Data

Sep. 7, 1994 [JP] Japan .................. 6-213883

[51] Int. Cl.⁶ .................................. H04N 7/18
[52] U.S. Cl. .................. 364/561.444; 356/3.444
[58] Field of Search .............. 354/403; 250/201.2, 250/201.4; 356/3.13, 3.14, 3; 364/556, 560, 561, 562

[56] References Cited

U.S. PATENT DOCUMENTS

| | | | |
|---|---|---|---|
| 4,461,175 | 7/1984 | Baumgart et al. | 73/295 |
| 4,582,424 | 4/1986 | Kawabata | 356/1 |
| 4,920,412 | 4/1990 | Gerdt et al. | 358/95 |
| 5,163,323 | 11/1992 | Davidson | 73/290 V |
| 5,485,262 | 1/1996 | Tsunemiga et al. | 356/3.08 |

Primary Examiner—Emanuel T. Voeltz
Assistant Examiner—Craig Steven Miller
Attorney, Agent, or Firm—Adams & Wilks

[57] ABSTRACT

A distance measurement device comprises distance measurement device for measuring a distance to an object, a processor for judging a result of the distance measurement of the distance measurement device, a first digital switch connected to the processor for setting a first division point where a measurement range of the distance measurement means is divided into a first long distance side and a first short distance side, a second digital switch for setting a second division point where a range between the first division point and the first short distance side is further divided into a second long distance side and a second short distance side. Based on the set states of the first and second digital switches, the processor determines which area the measurement result of the distance measurement device belongs to, from the plurality of distance areas into which the measurement result of the distance measurement device is divided with the first division point and the second division point.

16 Claims, 7 Drawing Sheets

FIG. 5

| LPAn [mm] \ LPBm [mm] | n \ m | 0 | 1 | 2 | 3 | ... | 14 | 15 |
|---|---|---|---|---|---|---|---|---|
| 0 | 500 | 0 | 500 | 500 | 500 | 500 | | 500 | 500 |
| 1 | 700 | 1 | 500 | 512 | 525 | 537 | | 675 | 688 |
| 2 | 900 | 2 | 500 | 525 | 550 | 575 | | 850 | 875 |
| 3 | 1100 | 3 | 500 | 537 | 575 | 612 | | 1025 | 1063 |
| 4 | 1300 | 4 | 500 | 550 | 600 | 650 | | 1200 | 1250 |
| ... | | | | | | | | | |
| 11 | 2700 | 11 | 500 | 637 | 775 | 912 | | 2425 | 2562 |
| 12 | 2900 | 12 | 500 | 650 | 800 | 950 | | 2600 | 2750 |
| 13 | 3100 | 13 | 500 | 662 | 825 | 987 | | 2775 | 2937 |
| 14 | 3300 | 14 | 500 | 675 | 850 | 1025 | | 2950 | 3125 |
| 15 | 3500 | 15 | 500 | 687 | 875 | 1062 | | 3125 | 3312 |

1

DEVICE FOR DETERMINING A DISTANCE RANGE OF AN OBJECT

FIELD OF THE INVENTION

The present invention relates generally to a distance measurement device for measuring the distance to an object. More specifically, the present invention relates to a distance measurement device which includes means for dividing its full distance measurement range into a plurality of measurement zones and which determines the respective measurement zone of an object measured by the device.

BACKGROUND INFORMATION

Applicants have proposed a distance measurement device which is capable of determining whether an object is within a specific user-defined measurement zone. In applicants' earlier distance measurement device, the full distance measurement range of the device is divided into a plurality of user-defined measurement zones. The device measures the distance to an object, and a determination is made as to which user-defined measurement zone the measurement corresponds to.

Setting of the user-defined measurement zones is illustrated in FIG. 6. For example, when the full range of distance measurement of a distance measurement device is divided into three zones, Z61, Z62, and Z63, as shown in FIG. 6(c), a division point on the long distance side, Pa, and a division point on the short distance side, Pb, can be set by the user with two division point setting means operating independently from each other, as shown in FIGS. 6(a) and 6(b). For example, a construction having 16 possible fixed division points (Pa0 to Pa15 and Pb0 to Pb15) can be achieved with combinations of output voltage levels on four-bit outputs for each of two division point setting means.

In the aforedescribed distance measurement device, the long distance side division point Pa and the short distance side division point Pb are set separately with two independent division point setting means to provide three distinct measurement zones Z61, Z62, and Z63. As a result, setting of the division points is determined by the number of output bits of the division point setting means, and the long distance side and the short distance setting means each have the same resolution.

FIG. 7 illustrates a typical application of such a distance measurement device. In FIG. 7, the device is applied to an object detecting device M for detecting articles traveling on belt conveyors BC1, BC2, and BC3 each of width, w, arranged in parallel. If the right side of the Delt conveyor BC1 is set to one division point Pb and the right side of the belt conveyor BC2 is set to one division point Pa, the distance measurement device will determine that a detected article S is in the measurement zone Z61 when it is on the belt conveyor BC1, measurement zone Z62 when it is on belt conveyor BC2, and measurement zone Z63 when it is on the belt conveyor BC3.

Another typical application of the above-described distance measurement device is the investigation of the amount of traffic on a multi-lane road, wherein the respective lanes correspond to different user-defined measurement zones.

In the case of a four-bit division point setting means, if the full range of distance measurement of the device is 0.5 to 3.7 m and division points are set at equidistant intervals, the minimum resolution will be fixed at 0.2 m over the entire 3.2 m measurement range. In general, however, the short distance side and the long distance side do not always need to be of the same accuracy, and a higher resolution is often needed at one of the sides. For example, in connection with photographic applications, a lower resolution at the near side of distance measurement is more critical than at the far side. For this reason, when a higher resolution is needed, for example, at the short distance side, it is desirable to change the distance between division points in stages such that the interval between division points is smaller at the short distance side and larger at the long distance side, while avoiding the tendency of setting the division points on the long distance side too rough. Also, there is the problem that if the long distance side division point Pa is capable of being erroneously set smaller than the short distance side division point Pb, means for producing an alarm are needed.

SUMMARY OF THE INVENTION

In view of the foregoing, it is therefore an object of the present invention to provide a distance measurement device which is capable of setting division points closer in a measurement zone where a higher resolution is needed.

It is another object of the present invention to provide a distance measurement device where there is no possibility that the long distance side division point Pa can be set to a smaller value than the short distance side division point Pb.

To achieve the above-described and other objects, a distance measurement device comprises distance measurement means for measuring a distance to an object, judgment means for judging a result of the distance measurement of the distance measurement means, and first and second setting means connected to the judgment means for setting a plurality of division points.

In one embodiment of the present invention, the full measurement range of the distance measurement means is divided into a plurality of measurement zones including a long distance side and a short distance side by the first setting means. The second setting means is used for setting a second division point smaller than the first division point. The distance range between the second division point and the short distance side is itself divided into measurement zones including a long distance side and a short distance side. The judgment means judges, based on the set states of the first and second setting means, which measurement zone the measurement result of the distance measurement means belongs to, from the plurality of measurement zones into which the measurement range of the distance measurement means is divided by the first and second division points.

Preferably, the first setting means sets a first division point which divides the measurable range of the device into equal zones, and the second setting means sets a second division point which includes the measurable range of the device on the short distance side of the first division point into a pair of measurement zones of equal distances. Alternatively, the first and second setting means may divide the measurable range of the distance measurement means into any predetermined number of equal or non-equal areas.

Most preferably, the measurable range of the device is divided into an integer multiple of the number of division points that the first setting means can set and the number of division points that the second setting means can set.

In addition, the judgment means preferably includes computation means for converting states of the first and second setting means and the distance measurement result of the distance measurement means into compatible quantities.

In accordance with a second embodiment of the present invention, the distance measurement device further includes storage means for storing set information on the first and second division points in accordance with the set states of the first and second setting means, and the judgment means judges, based on the set information on the division point that is output by the storage means in accordance with the set states of the first and second setting means, which zone the distance measurement result of the distance measurement means belongs to, from a plurality of measurement zones into which the distance measurement result of the distance measurement means is divided with the first division point and the second division point.

BRIEF DESCRIPTION OF THE DRAWINGS

FIG. 5 is a diagram showing the distance information on a division point basis stored in the storage means of the second embodiment;

DETAILED DESCRIPTION OF THE PREFERRED EMBODIMENTS

The present invention will hereinafter be described in detail in accordance with the specific embodiments shown in the accompanying drawings.

Figure 1:
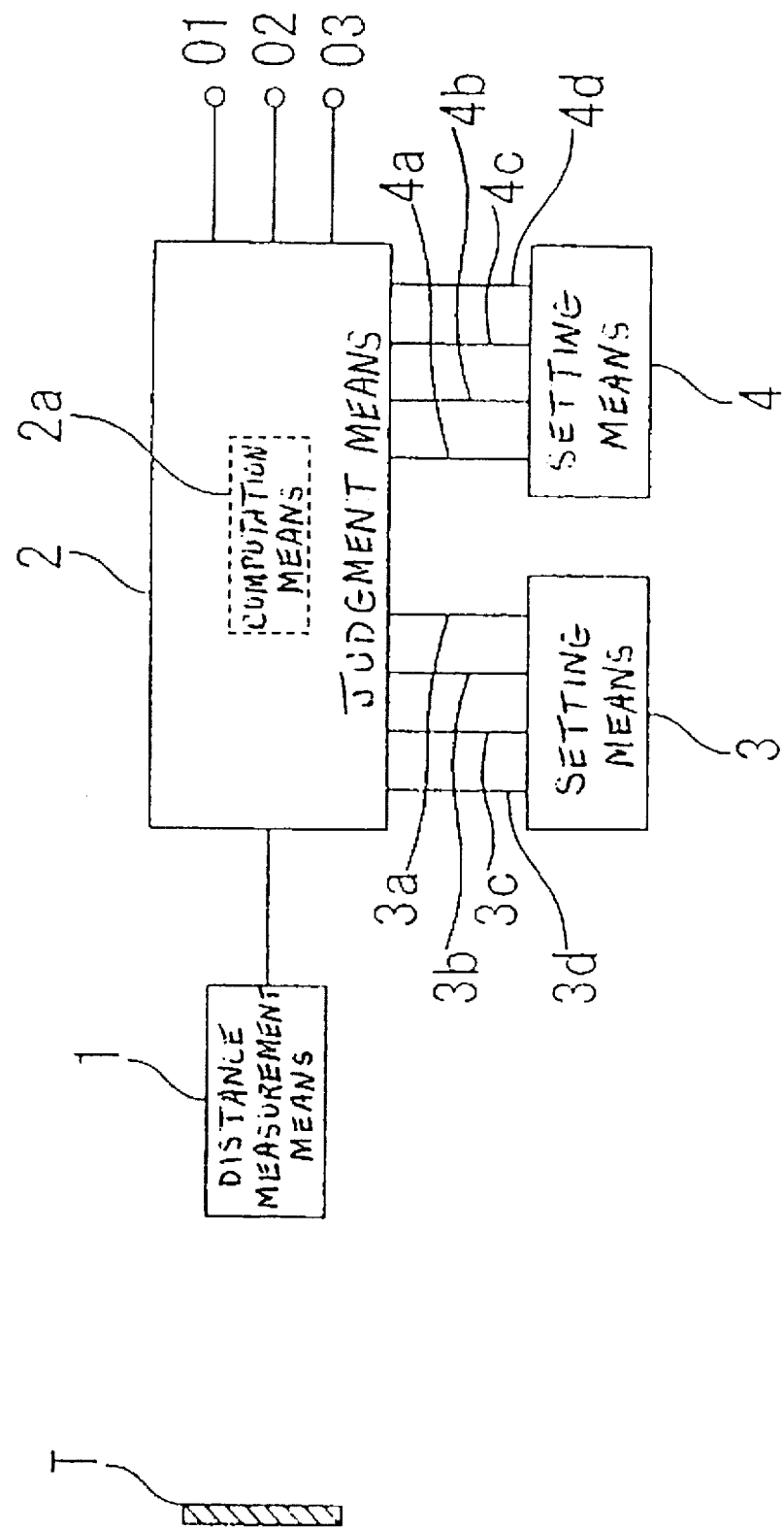
FIG. 1 is a circuit block diagram showing the construction of a distance measurement device in accordance with a first embodiment of the present invention.
Figure 2:
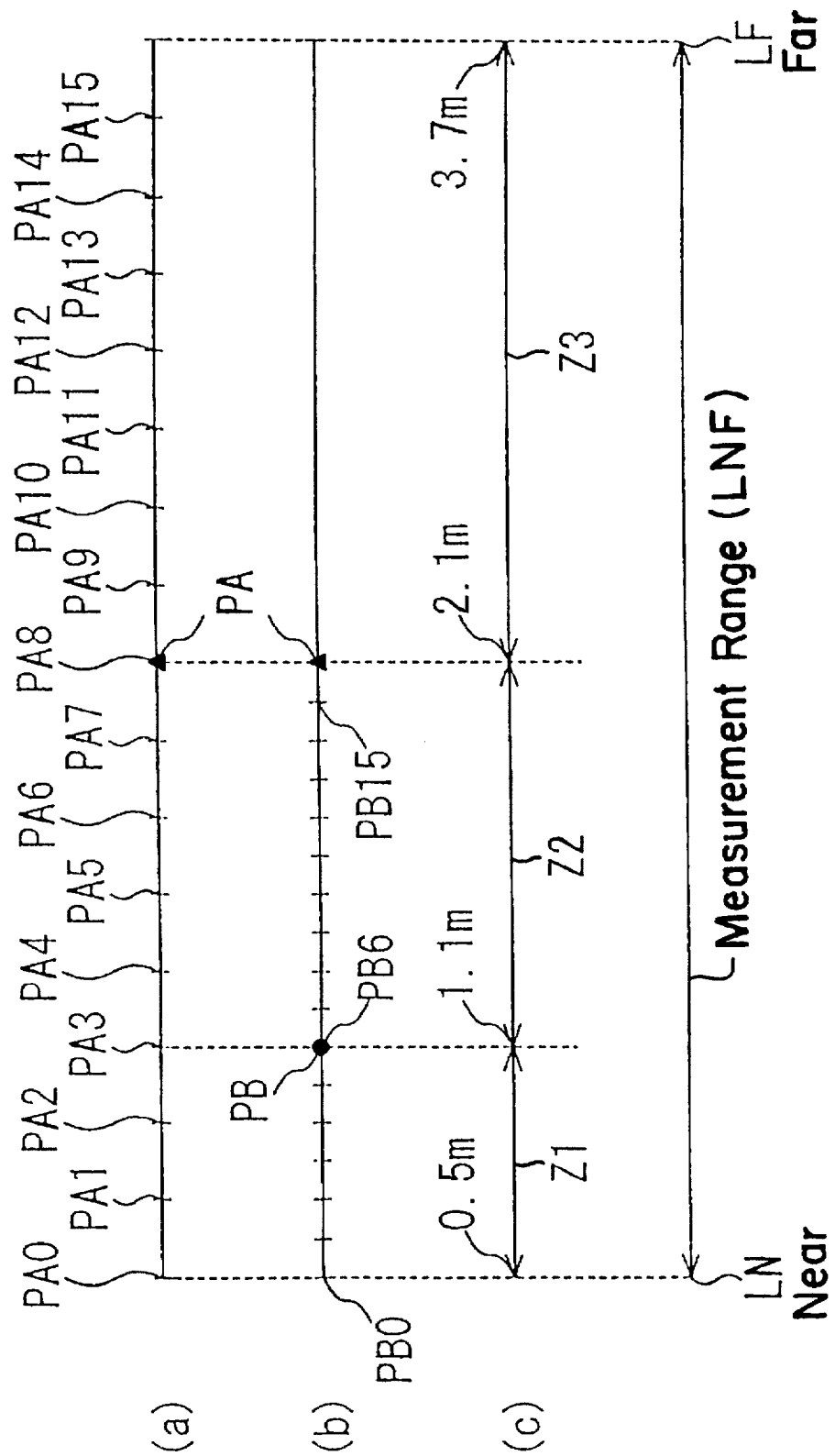
FIG. 2 is a diagram used to explain the setting of division points and measurement zones in the first embodiment of the present invention.

FIG. 1 is a circuit block diagram showing the construction of a distance measurement device according to a first embodiment of the present invention. For simplicity, there is shown a case where the full range of distance measurement is divided into three separate measurement zones using two distance division points. Reference numeral 1 denotes distance measurement means for measuring the distance to an object T and converting the result of the distance measurement into a digital output signal. The distance measurement means may comprise, for example, means for emitting infrared light toward the object T and detecting light reflected from the object T with a position sensitive device (PSD), or means using ultrasonic waves. Reference numeral 3 denotes first setting means comprising a digital switch, which has a plurality of digital output lines. In this case, four signal lines 3a, 3b, 3c, and 3d are shown. Thus, 16 different digital output settings are possible by varying the digital output of the respective signal lines. The first setting means 3 is used for setting a first distance point Pa (hereinafter referred to as a first division point) such that the full distance measurement range of the distance measurement means 1 is divided into a long distance side and a short distance side. This is shown in FIG. 2, wherein it can be seen that the full measurement range of the device (LNF) is from 0.5 to 3.7 m and PA is set at 2.1 m.

Reference numeral 4 denotes second setting means. As with the first setting means 3, 16 different settings are possible with four signal lines 4a, 4b, 4c, and 4d. The second setting means 4 is used for setting a second distance point PB (hereinafter referred to as a second division point). The second division point Pb is set within the full measurement range of the distance measurement means 1 such that it is smaller than the first division point set by the first setting means 3. By setting the second division point between the shortest measurable distance of the distance measurement means 1 and the first division point, the short distance side of the division point is thereby further divided into a long distance side and a short distance side.

This relationship will now be described in greater detail with reference to FIG. 2. The abscissa in FIG. 2 represents a distance L from the distance measurement means 1. The farthest distance that can be measured is represented by LF, the shortest distance that can be measured is represented by LN, and the distance measurement range between the longest distance point LF and the shortest distance point LN is represented by LNF. As illustrated in FIG. 2(a), the distance measurement range LNF is divided into 16 equal regions corresponding to the 16 different settings of the first setting means 3. Assuming that the above-described first division point is PA, then the division point PA can be set to any of distance points PAn where n is a natural number between 0 and 15, as shown in FIG. 2(a). Assuming that LF is 3.7 m and LN is 0.5 m, the case is shown where the division point PA has been set to PA8 (n=8), and a distance from the distance measurement means 1 becomes 2.1 m (0.5 m+8×0.2 m).

Next, the case is considered where the distance measurement range between the division point PA and the shortest point LN is further divided into 16 equal parts corresponding to the 16 different settings of the second setting means 4. Assuming that the above-described second division point is PB, the division point PB can be set to any of distance points PBm where m is a natural number between 0 and 15, as shown in FIG. 2(b). In the figure, the case is shown in which the second division point PB has been set to PB6 (n=6), and a distance from the distance measurement means 1 becomes 1.1 m (0.5 m+6×0.1 m). That is, the first division point PA is set to 2.1 m and the second division point PB is set to 1.1 m by the first setting means 3 and the second setting means 4, respectively.

Figure 6:
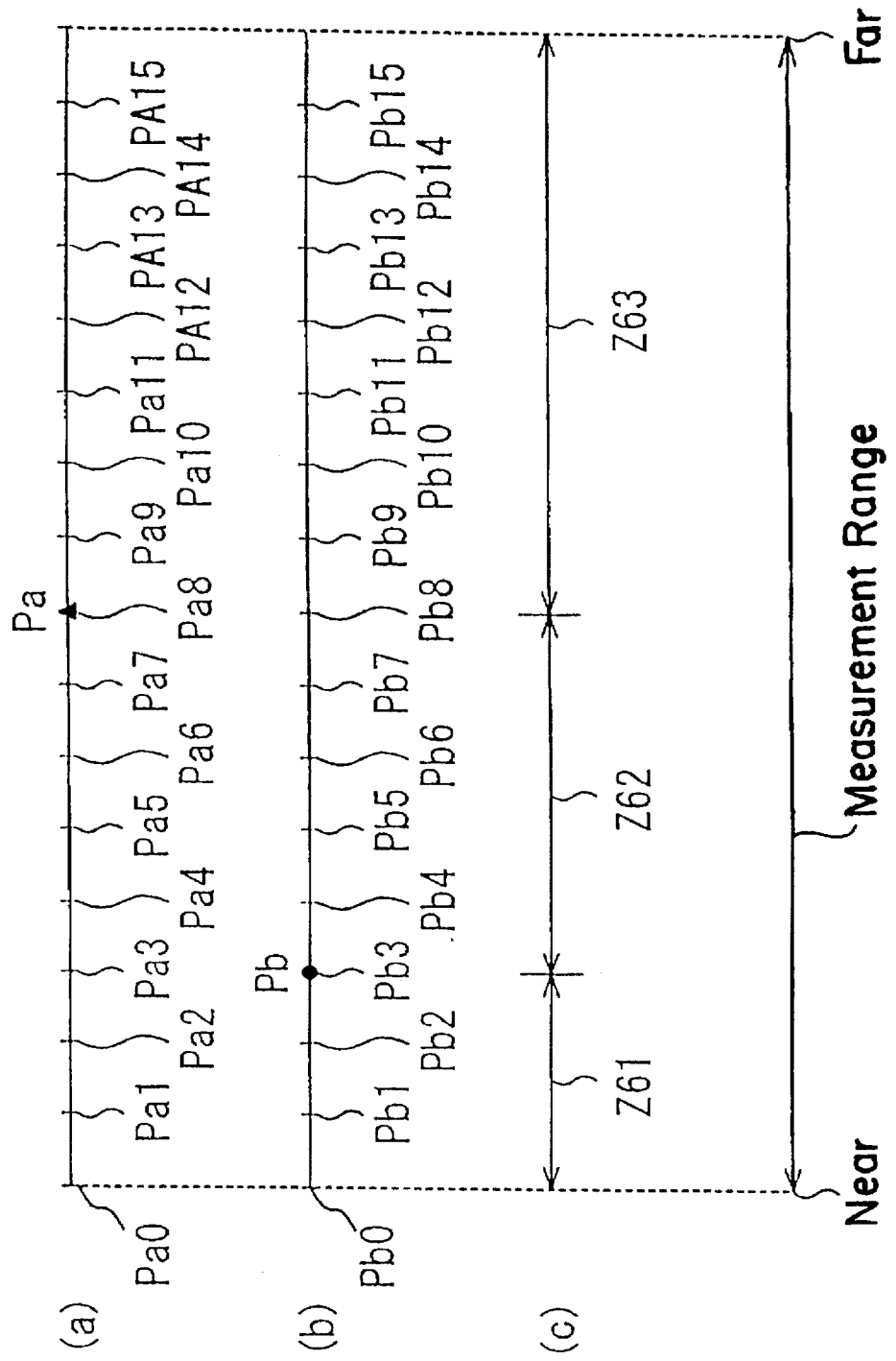
FIG. 6 is a diagram used to explain a general distance measurement device.
Figure 7:
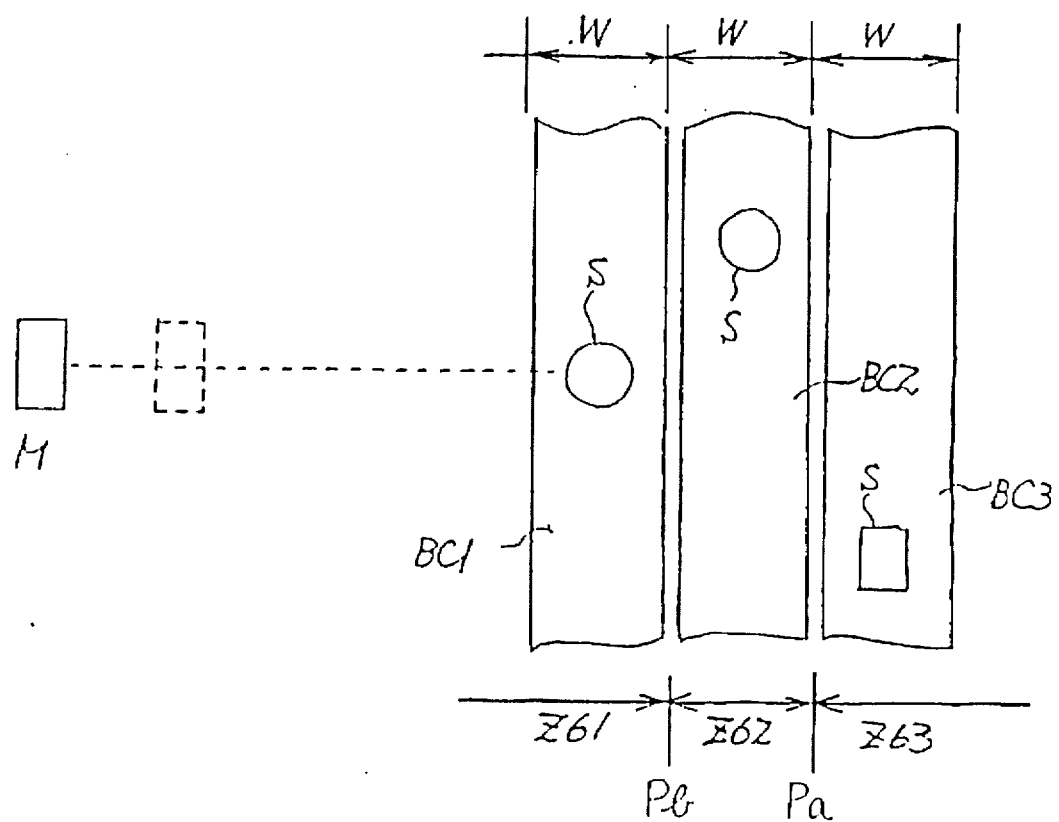
FIG. 7 is a diagram used to explain a typical application of the distance measuring device.

As will be appreciated from the foregoing description, the minimum resolution of the second division point PB on the short distance side is 0.1 m, which resolution is improved as compared with the general example illustrated in FIG. 6. Note that if the division point PA is set to a position closer to the shortest point LN, the minimum resolution of the second division point PB will be further improved.

As illustrated in FIG. 2(c), three measurement zones Z1, Z2 and Z3 are formed using the first and second division points.

Returning to FIG. 1, reference numeral 2 denotes judgment means, which may be, for example, a microcontroller or a microprocessor, for determining the measurement zone that the distance measurement result of the distance measurement means 1 belongs to, among the three measurement zones Z1, Z2, and Z3 (see FIG. 2 (c)) which are divided at the first division point PA and the second division point PB. The judgment means 2 outputs the result of judgment to output terminals 01, 02, and 03. If, for example, the distance measurement result of the distance measurement means 1 is 0.9 m, it will be in the measurement zone Z1 and therefore only output terminal 01 will be set to a high voltage level.

Similarly, if the measurement result of the distance measurement means 1 is 1.5 m, it will be in the measurement zone Z2 and, therefore, only output terminal 02 will be set to a high voltage level. On the other hand, if the measurement result of the distance measurement means 1 is 2.8 m, it will be in the measurement zone Z3 and, therefore, only the voltage on output terminal 03 will be set to a high voltage level.

When the measurement result of the distance measurement means 1 is outside the distance measurement range LNF, an output different from these may be generated. For example, all of the output terminals 01 to 03 may be set to high voltage levels, or the result may be output to an additional output terminal (not shown).

Next, a description will be provided of an actual judgment method of the judgment means 2. The distance measurement means 1 first emits an infrared beam toward an object T and then receives the reflected light with a position sensitive device (hereinafter referred to as a PSD). If the distance to the object T changes, the position of reflected light incident on the PSD will change. The PSD converts the position of the incident light into two output currents i1 and i2. The current i1 corresponds to the current of the short distance end of the PSD, and the current i2 corresponds to the current of the long distance end of the PSD.

From the currents i1 and i2 that are generated in this manner, the following number NP which corresponds to a distance to an object is obtained based on Equation (1).

$$NP = i1/(i1+i2) \tag{1}$$

The number NP is substantially inversely proportional to the distance L to the object T. Therefore, in order to determine which measurement zone the measurement result of the distance measurement means 1 belongs to, it is necessary that the states of the above-described division points PA8 and PB6, which are set by the first setting means 3 and the second set means 4, are converted into mutually comparable quantities and then compared. Reference numeral 2a in FIG. 1 represents computation means used for performing this computation.

Figure 3:
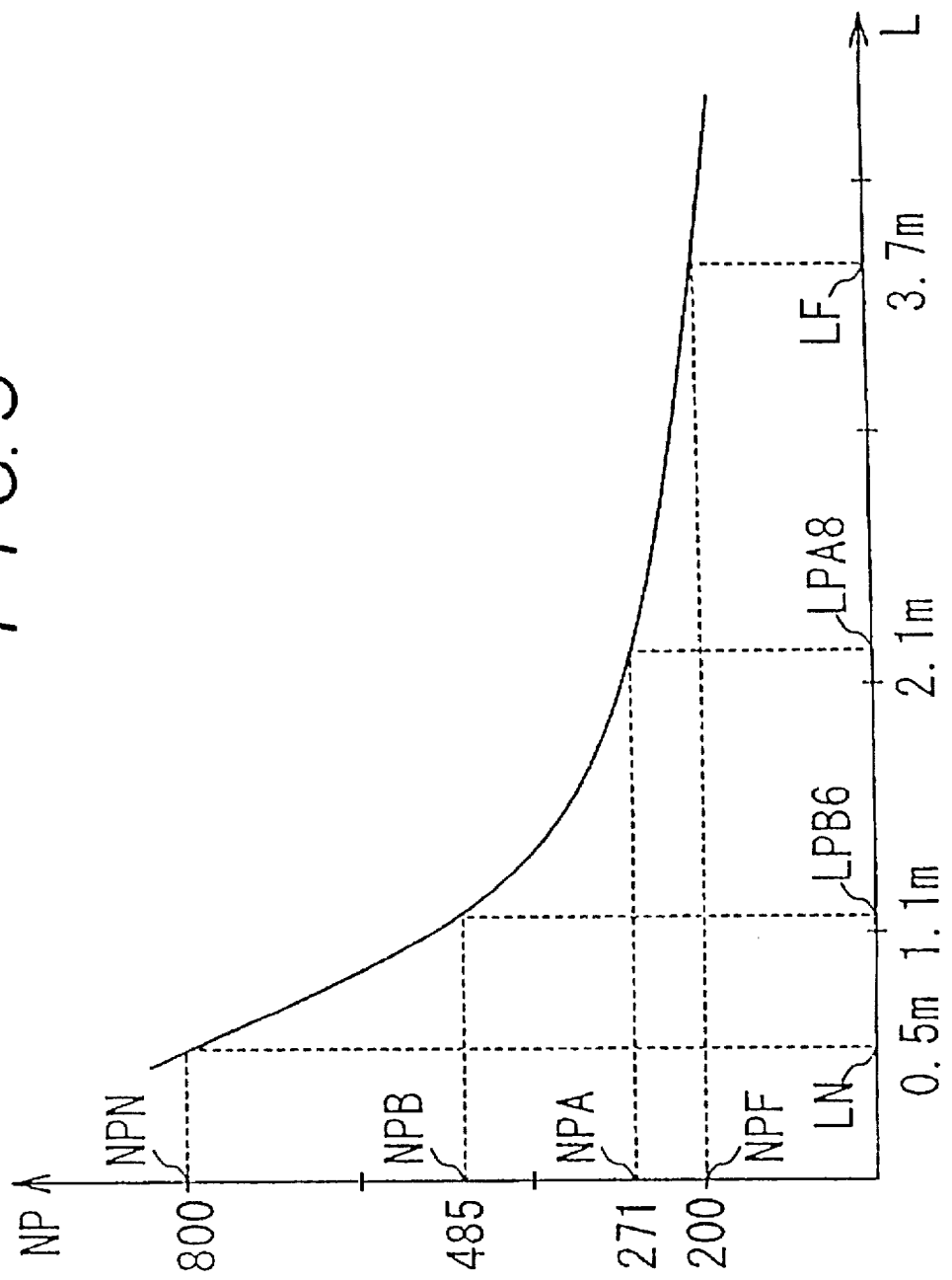
FIG. 3 is a graph used to explain the judgment method of the judgment means of the present invention.

FIG. 3 is a graph showing the relationship between the above-described number NP and the distance L from the distance measurement means 1 to the object T. The numbers corresponding to the shortest distance point LN and longest distance point LF are values that are determined by the construction of the distance measurement means 1, and these numbers are assumed to be NPN and NPF, respectively.

If it is now assumed that a number corresponding to the distance value LP of the division point that is set is NPx, the following Equations (2) to (4) will be satisfied.

$$NPx = \{(NPN-NPF)(1/LF-1/LN)\}\cdot(1/LP-1/LN)+NPN \tag{2}$$

$$LPAn = LN+(LF-LN)\times(n/16) \tag{3}$$

$$LPBm = LN+(LPAn-LN)(m/16) \tag{4}$$

where LPAn is the distance value of the nth first division point, LPBm is the distance value of the mth second division point, and n, m are natural numbers between 0 and 15. LPAn or LPBm is substituted for LP in Equation (2).

While it has thus far been described that the distance LPA8 of the first division point. PA8 is 2.1 m and the second division point LPB6 is 1.1 m, these values are obtained by calculation using the above-described Equations (3) and (4). If it is now assumed that NPN is 800, NPF is 200, and the numbers of the above-described division points are NPA and NPB, then NPA=271 and NPB=485 will be obtained from Equation (4). Therefore, when the value of the distance measurement result of the distance measurement means 1 is less than 271, it can be judged that the measurement result belongs to the distance area Z3.

When the number of the distance measurement result of the distance measurement means 1 is between 271 and 485, it can be judged that the measurement result belongs to the distance area Z2. When the number of the distance measurement result of the distance measurement means 1 is more than 485, it can be judged that the measurement result belongs to the distance area Z1.

While in the above embodiment the number NP has been assumed to be substantially inversely proportional to the distance L to the object T and computed according to Equation (2), a correction term may be added to this equation, or accuracy of judgment can be increased by using an optimizing equation, depending on the specific type of distance measurement means 1.

Figure 4:
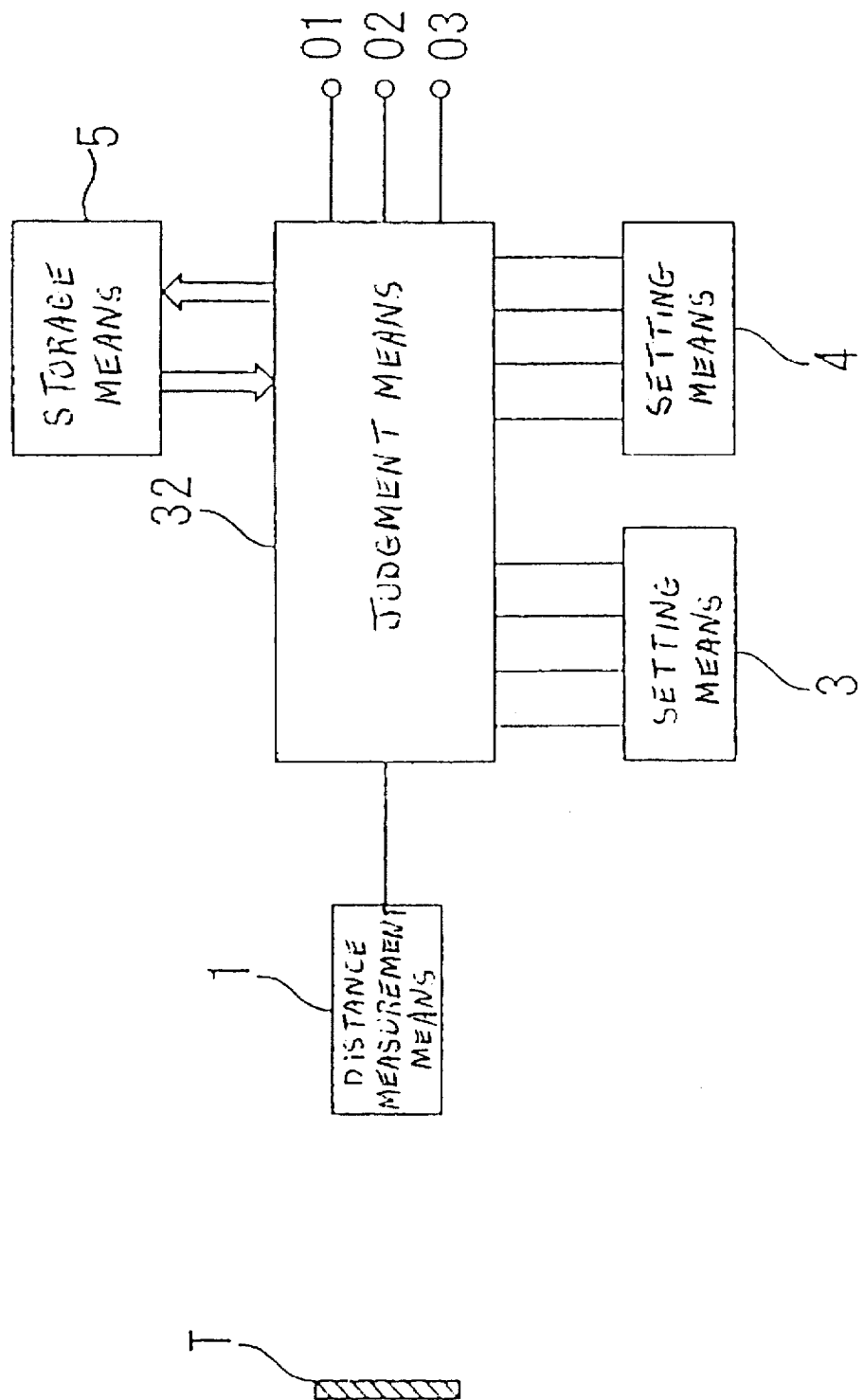
FIG. 4 is a circuit block diagram showing the construction of a distance measurement device in accordance with a second embodiment of the present invention.

Next, a second embodiment of the present invention will be described in accordance with FIGS. 4 and 5. FIG. 4 is a circuit block diagram showing the construction of the second embodiment. Reference numeral 32, as in the first embodiment, is a judgment means, such as a microcontroller or microprocessor, that judges which measurement zone the result of distance measurement performed by distance measurement means 1 belongs to. Reference numeral 5 is a storage means, which has prestored distance values for division points corresponding to each possible output setting of first and second setting means 3 and 4. The same reference numerals are applied to the same elements as in FIG. 1.

FIG. 5 is a table showing examples of the distance values of division points stored in the storage means 5. The column represents the distance value LPAn of the distance point PAn of a division point PA that is set by the first setting means 3, and the row represents the distance value LPBm of the distance point PBm of a division point PB that is set by the second setting means 4 when one distance value LPAn is determined. Here, m and n are both natural numbers between 0 and 15. As in the first embodiment, the measurable distance range is 500 mm to 3700 mm and is divided into 16 equal parts with equidistant division points. When the first setting means 3 is set at n=2, the distance value LPAn is 900 mm. If, in that state the second setting means 4 is set at m=2, the distance value LPBm will become 550 mm.

For the distance value LPBm, there is a point where the change in the distance value with respect to the change in the value of m is not a constant value. This is because fractional processing is required since the measurable range is divided into 16 equal parts. For example, the row of n=1 of the distance value LPAn changes by 12.5 mm according to calculation, each time m changes 1. In this embodiment, however, 12 mm and 13 mm changes are alternately used. If the distance measurement range LNF is set to a multiple of 256, then a fraction such as this will be avoided and accuracy will be increased. This is because the distance measurement range LNF is a multiple of 256, and when dividing this range into 16 equal parts by the first setting means 3 and further dividing it into 16 equal parts by the second setting means 4, the result is that each sub-range has an equal, integer value.

If in FIG. 4, the first setting means 3 and the second setting means 4 are set, the judgment means 32 will read the distance values corresponding to the first division point and the second division point from the storage means 5. The measurement zone that the measurement result belongs to is judged by converting the result into a corresponding number using Equation (1) and comparing it with the measurement result of the distance measurement means 1. Therefore, it becomes unnecessary to perform the calculation of Equations (2) and (3).

Also, in the above-described embodiment while the distance value has been stored in the storage means 5, a number NP corresponding to the distance value may alternatively be stored directly. With this, the above-described calculation of Equation (1) becomes unnecessary and the construction of the judgment means 32 can be simplified.

While in the above-described first and second embodiments the division points have been set so that the distance measurement range LNF is divided into equal parts, the present invention is not thereby limited. The division width may be changed, as described, according to a predetermined formula based on a relationship such as a fractional function or a logarithmic function. Various other modifications are also possible.

For example, the division width may be made fine at a short distance and rough at a long distance, or the division points PAn may be divided according to a predetermined formula while the other points are divided into equal parts, or vice versa. Also, while the above-described embodiments have been constructed so that higher resolution is obtained at a short distance side, in contrast with this, the device may be constructed such that higher resolution is obtained at a long distance side.

Further, although in the above embodiments it has been described that a range of measurement is divided into three distance areas with two distance division points, the present invention is not thereby limited. It is possible to set (k+1) distance areas with k division points. For example, four distance areas can be set with three setting means.

Further, although in the above embodiments the first and second setting means 3 and 4 have been made such that 16 different division points can be set with signal lines of four bits, the number of bits may be increased or decreased.

In accordance with the present invention, when a plurality of measurement zones are set with a plurality of distance division points, the distance on the short distance side, for example, can be set fine, and a distance measurement device with enhanced accuracy can be constructed. Also, since the first distance division point oil a side where accuracy is not needed is first set and, between that division point and a side where greater accuracy is needed, the second division point is set, there can be provided a distance measurement device where there is no possibility that the long distance side is inadvertently set smaller than the short distance side and which is easy to use.

We claim:

1. A device for determining a distance range of an object, comprising: distance measurement means for measuring a distance to an object; setting means for dividing an effective measurement range of the distance measurement means into a plurality of measurement zones; judging means for judging which measurement zone the object is in; and output means for outputting a signal in accordance with an output of the judging means; wherein the setting means comprises first setting means for dividing the effective measurement range of the distance measurement means into a plurality of first measurement zones, and second setting means for dividing at least one of the plurality of first measurement zones into a plurality of second measurement zones.

2. A device for determining a distance range of an object according to claim 1; wherein the plurality of first measurement zones comprises a first long distance side and a first short distance side, and the plurality of second measurement zones comprises a second long distance side and a second short distance side.

3. A device for determining a distance range of an object according to claim 2; wherein the first measurement zones are equal in distance and the second measurement zones are equal in distance.

4. A device for determining a distance range of an object according to claim 1; wherein the effective measurement range of the distance measurement means is divided into an integer number of measurement zones, equalling the product of the number of first measurement zones and the number of second measurement zones.

5. A device for determining a distance range of an object according to claim 1; wherein the judging means includes computation means for converting the set states of the first and second setting means into compatible values.

6. A device for determining a distance range of an object, comprising: distance measurement means for measuring a distance to an object; setting means for dividing an effective measurement range of the distance measurement means into a plurality of measurement zones; output means for outputting a signal in accordance with an output of the judging means; a memory for storing boundary information concerning the measurement zones in accordance with a set state of the setting means; and judging means for judging which measurement zone the object is in in accordance with boundary information from the memory; wherein the setting means comprises first setting means for dividing the effective measurement range of the measurement means into a plurality of first measurement zones, and second setting means for dividing at least one of the plurality of first measurement zones into a plurality of second measurement zones.

7. A device for determining a distance range of an object according to claim 6; wherein the plurality of first measurement zones comprises a first long distance side and a first short distance side, and the plurality of second measurement zones comprises a second long distance side and a second short distance side.

8. A device for determining a distance range of an object according to claim wherein the first measurement zones are equal in distance and the second measurement zones are equal in distance.

9. A device for determining a distance range of an object, comprising: distance measurement means for measuring a distance to an object; setting means for dividing an effective measurement range of the distance measurement means into three or more measurement zones; judging means for judging which measurement zone the object is in; and output means for generating an output signal in accordance with an output of the judging means; wherein the setting means comprises first setting means for dividing the effective measurement range of the distance measurement means into a plurality of first measurement zones by using at least one of a plurality of first division points which divide the effective measurement range by first intervals, and second setting means for dividing at least one of the plurality of first measurement zones into a plurality of second measurement zones by using at least one of a plurality of second division points which divide one of the divided first measurement zones by second intervals smaller than the first intervals.

10. A device for determining a distance range of an object according to claim 9; wherein the plurality of first measurement zones comprises a first long distance side and a first short distance side, and the plurality of second division points divides the first short distance side into the plurality of second measurement zones.

11. A device for determining a distance range of an object according to claim 9; wherein the plurality of first measurement zones comprises a first long distance side and a first short distance side, and the plurality of second measurement zones comprises a second long distance side and a second short distance side.

12. A device for determining a distance range of an object according to claim 9; wherein the first division points divide the effective measurement range by a first equal interval.

13. A device for determining a distance range of an object according to claim 12; wherein the second division points divide the nearest range by a second equal interval shorter than the first equal interval.

14. A device for determining a distance range of an object according to claim 9; wherein the first division points divide the effective measurement range according to a formula based on one of a fractional function and a logarithmic function.

15. A device for determining a distance range of an object according to claim 14; wherein the second division points divide the effective measurement range according to a formula based on one of a fractional function and a logarithmic function.

16. A device for determining a distance range of an object according to claim 9; wherein the number of first division points is equal to the number of second division points.

* * * * *